United States Patent [19]

Berthold et al.

[11] Patent Number: 4,934,470
[45] Date of Patent: Jun. 19, 1990

[54] DATA INPUT BOARD

[75] Inventors: Gottfried Berthold, Reutlingen; Peter Ambros, Leutershausen; Walter Muller, Salz, all of Fed. Rep. of Germany

[73] Assignee: Preh-Werke GmbH & Co. KG, Bad Neustadt/Saale, Fed. Rep. of Germany

[21] Appl. No.: 358,302

[22] Filed: May 30, 1989

[30] Foreign Application Priority Data

May 28, 1988 [DE] Fed. Rep. of Germany ....... 3818170

[51] Int. Cl.$^5$ .............................................. G08C 21/00
[52] U.S. Cl. .................................................... 178/18
[58] Field of Search ............................... 178/18, 19, 20

[56] References Cited

U.S. PATENT DOCUMENTS 4,149,029  4/1979  Pobgee .................................. 178/18

FOREIGN PATENT DOCUMENTS 0112975  9/1983  European Pat. Off. .
0194861  3/1986  European Pat. Off. .
3602061  7/1987  Fed. Rep. of Germany .
3322382  5/1989  Fed. Rep. of Germany .

OTHER PUBLICATIONS

Patent Abstracts of Japan, P-414, Dec. 18, 1985, vol. 9, No. 323.

Primary Examiner—Stafford D. Schreyer
Attorney, Agent, or Firm—Wegner & Bretschneider

[57] ABSTRACT

A data input board for the electrical detection of the coordinates of a writing tip includes a rigid plate and an elastic plate with electrically conductive surfaces facing each other at a small distance which contact point by point under the effect of a writing tip. The elastic plate is formed as a stretched, coated sieve tissue in order to avoid the requirement of spacers within the input surface.

10 Claims, 1 Drawing Sheet

DATA INPUT BOARD

BACKGROUND OF THE INVENTION

The invention relates to a data input board for the electrical detection of the coordinates of a writing tip, comprising a rigid plate and an elastic plate each having an electrically conductive surface. The conductive surfaces are arranged electrically isolated at a small distance opposite each other by means of a frame-shaped spacer, and come in contact point by point under the impact of the writing tip on the outside of the elastic plate.

Japanese Patent Application No. 60-150124 describes such a data input board with transparent areal electrodes (i.e., electrodes having a superficial extent), the space provided by the frame being sealed between the areal electrodes and being filled with an insulating, viscous substance.

Further, a data input board is known from European Patent Application No. 0 194 861 comprising a conductive grid between the conductive surfaces kept at a distance by means of a frame.

Such data input boards are used in order to detect the coordinates of a writing tip, for example a pencil, acting with writing pressure upon the input surface of the board and in order to provide the coordinates for electronic processing, for example the representation on a screen (West German laid open application No. 36 02 061). In order to keep the opposite, electrically conductive surfaces at a distance without the effect of the writing tip, such devices are provided with spacers which may be formed as points or lines, for example, and are distributed over the input surface.

Those portions of the input surface which are directly associated to such spacers cannot be used for the detection of coordinates.

SUMMARY OF THE INVENTION

It is therefore an object of the invention to provide a data input board of the above-mentioned type for which spacers within the input surface are not required. This object is achieved by the fact that the sieve tissue is of the type formed by the common screen printing technique, coated with an electrically conductive material and kept stretched on a frame, as with the technique of screen printing.

With such a data input board comprising an unsupported, stretched writing surface the course of the writing tip may be detected continuously; electronic follow-up circuits for bridging detection gaps at the spacers are not necessary. The electric layout of the data input board may be designed according to the requirements of data acquisition electronics. Thus, for example, the opposite surfaces of the rigid and elastic plates may be equally homogeneous or coated with a resistive film structured in a pattern (German laid open application No. 36 02 061) as needed. It is also possible to provide for an areal or superficial resistance on the surface of the rigid plate, connected at all sides through point electrodes and facing a surface of high conductivity serving as a bus bar under the effect of a writing tip. Such a bus bar may replace a system-specific, electrically functioning scanning pin (European Patent No. 0 112 975).

Sieve tissues of metal-coated polymer fibers are stable against tension and relatively insensitive to sharp objects. Tissues of nickel-coated polyester fibers have proved especially suitable for input boards. The distance between the surfaces of the plates is exclusively determined by a frame-shaped spacer, and may be from 0.2 to 0.6 mm. The distance may be determined in the conceptual phase of the data input board, taking into consideration that a distance of 0.2 mm requires a smaller writing pressure whereas a distance of 0.6 mm makes the arrangement less sensitive to objects resting with their surface thereon, e.g. a writing hand. The conductive coating of the sieve's inner surface compensates for the tissue structure of the sieve; in addition, conductive carbon coatings stabilize the resistance of the contact. An insulating layer, in particular a laminated insulating layer, smoothes the writing surface and, thus, refines the writing feel. Thermoplast as binder or insulating means results in only a small degree of embrittlement and enhances the elasticity of the sieve's surface.

Since the electrically-coated rigid plate is not provided with spacers it has to be even in order to avoid malfunctions. Thus, it is advantageous to laminate the coating of the rigid plate (West German Patent No. 33 22 382), the substrate, e.g. of aluminum, being designed such that the tension forces of the sieve finally acting upon the substrate do not spoil it by bending.

BRIEF DESCRIPTION OF THE DRAWINGS

In the following an embodiment of the invention is explained in greater detail.

DESCRIPTION OF THE PREFERRED EMBODIMENTS

Figure 1:
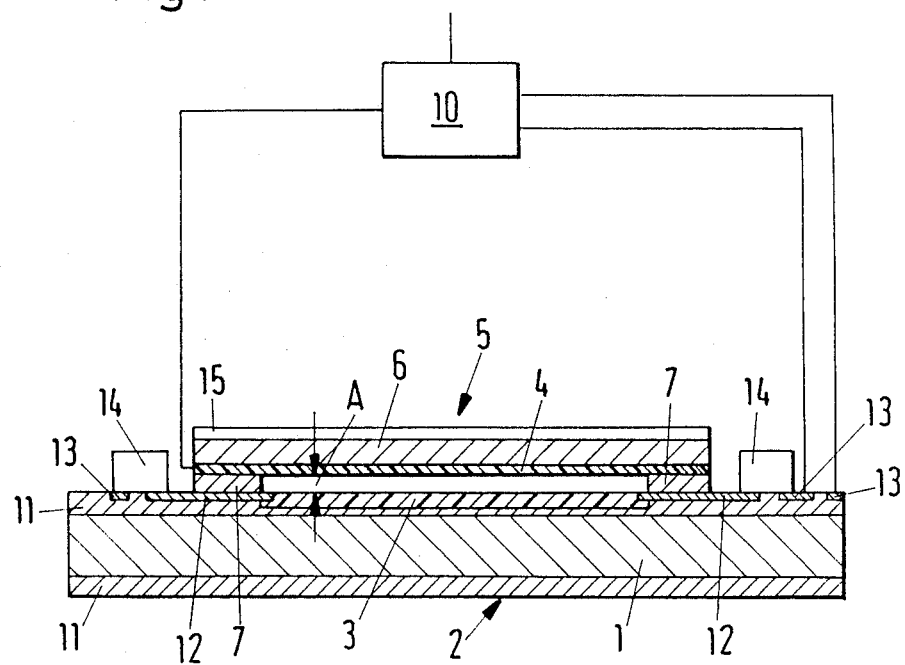
FIG. 1 shows a sectional, diagrammatic view of a data input board.
Figure 2:
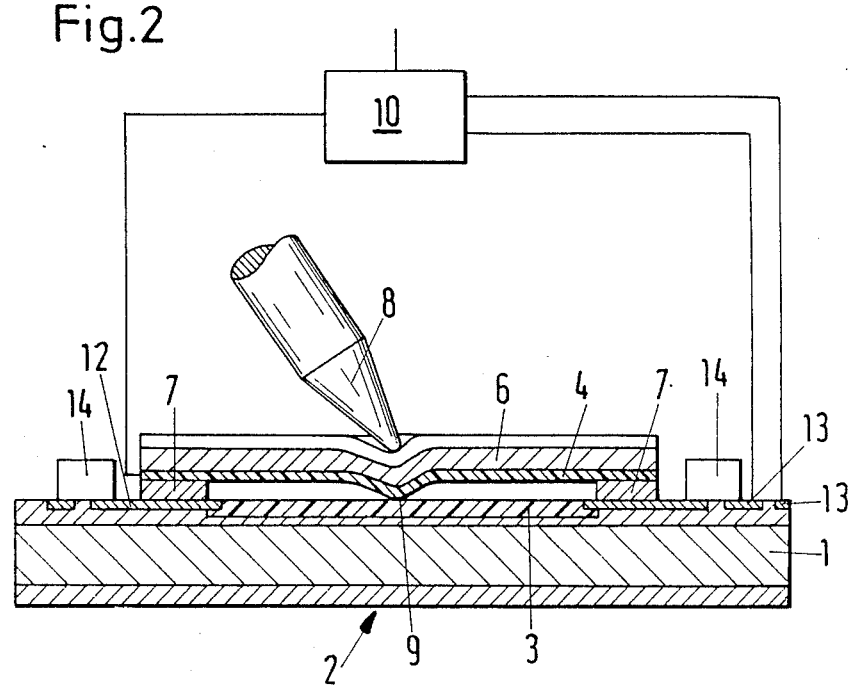
FIG. 2 shows the data input board under the effect of a writing tip.

A substrate 1, which is stable against bending, consists of aluminum or another suitable electrically-conducting or insulating material, and represents the rigid plate 2 of the data input board. The substrate 1 is coated at one side with a resistive layer 3 forming the conductive surface of the rigid plate 2. Opposite the resistive layer 3 is arranged the conductive material or layer 4 of the elastic plate 5. The elastic plate 5 is a sieve 6 supported under tension by a frame 7 such that the sieve 6, i.e. its conductive material or layer 4, bridges the resistive layer 3 at a distance A. Under the pressure of a writing tip 8 (FIG. 2) the sieve 6 deforms, and its conductive material 4 contacts the resistive layer 3 in a contact point 9 after having passed the distance A. An evaluation circuit 10 detects the coordinates of the contact point 9 on the resistive layer 3 and generates corresponding electric signals for further processing.

Both sides of the substrate 1 of the embodiment are coated with a heat-cement 11; the purpose of this sandwich coating is to avoid the bending of the substrate 1 by the coating. By way of reverse laminating, a resistance circuit with a very smooth surface is laminated into the heat-cement layer 11 of one side of the substrate 1. The resistance circuit comprises the resistive layer 3 forming the electrically conducting surface of the rigid plate 2, and the connection electrodes 12 of the resistive layer 3 and connection strip conductors 13. The point connection electrodes 12 contacting at all sides the resistive layer S are connected with the connection strip conductors 13 over blocking diodes 14. The resistance circuit corresponds to the embodiments of European Patent No. 0 112 975.

The sieve tissue 6 is coated at one side with a thermoplastic conductive material 4 of high conductivity; the surface of the conductive material 4 forms the electrically conducting surface of the elastic plate 5 bridging the opposite resistive layer 3 within the data input board. The conductive film is applied by means of screen printing on the fine-meshed tissue. On the second, outer side of the sieve tissue 6 a thermoplastic insulating foil 15 is laminated. The coating of the sieve tissue 6 as well as the drying of the layers 4 and 15 are effected with the sieve tissue 6 kept stretched in a stretching device. Such stretching devices are common in the technique of screen printing. A frame 7 coated on both sides with epoxy cement is arranged on the still-stretched tissue of the side of the sieve 6 coated with the conductive material 4. The stretching frame 7 is of an electrically insulating material, e.g. hard paper of 0.5 mm thickness. The already finished substrate 1 is applied on the frame 7 with proper orientation to the resistive layer 3. After the substrate 1 has been permanently connected with the frame 7 and the frame 7 with the sieve tissue 6 under the effect of pressure and heat, the frame 7 provides for the distance A. After having been removed or cut out from the stretching device, the sieve tissue 6 remains stretched over the frame 7 trussed by the substrate 1.

In a preferred embodiment, the sieve tissue 6 is a fine-meshed tissue of polymer fibers coated with metal.

In another preferred embodiment of the invention, the electrically conductive material 4 of the sieve tissue 6 is a polymer binder having conductive pigments of silver and/or graphite and/or carbon black dispersed therein.

We claim:

1. Data input board for the electric detection of the coordinates of a writing tip, comprising a rigid plate and an elastic plate, the rigid plate and the elastic plate having electrically conductive surfaces arranged electrically insulated opposite each other at a small distance, whereby the electrically conductive surfaces of the rigid plate and the elastic plate contact point by point under the effect of the writing tip on the outside of the elastic plate, wherein the elastic plate comprises a sieve tissue coated on one entire side with an electrically conductive material, the sieve tissue formed by screen printing and kept stretched on the frame, the electrically conductive material forming the electrically conductive surface.

2. Data input board according to claim 1, wherein the sieve tissue is a fine-meshed tissue of polymer fibers and the electrically conductive material is metal.

3. Data input board according to claim 1, wherein the small distance between the electrically conductive surfaces of the rigid plate and the elastic plate is 0.2 to 0.6 mm.

4. Data input board according to claim 1, wherein the electrically conductive material of the sieve tissue consists of a polymer binder with conductive pigments of at least one of silver, graphite and carbon black dispersed therein.

5. Data input board according to claim 4, wherein the polymer binder is a thermoplast.

6. Data input board according to claim 2, wherein the electrically conductive material of the sieve tissue consists of a polymer binder with conductive pigments of at least one of silver, graphite and carbon black dispersed therein.

7. Data input board according to claim 6, wherein the polymer binder is a thermoplast.

8. Data input board according to claim 1, further comprising an insulating layer on the second, outer side of the sieve tissue.

9. Data input board according to claim 8, wherein the insulating laYer consists of a laminated foil of thermoplastic material.

10. Data input board according to claim 1, wherein the rigid plate is a coated substrate of aluminum.

* * * * *